US007638069B2

(12) United States Patent
Maes et al.

(10) Patent No.: US 7,638,069 B2
(45) **Date of Patent: *Dec. 29, 2009**

(54) POTASSIUM PROPIONATES FOR USE AS FREEZING POINT DEPRESSANTS AND CORROSION PROTECTION IN HEAT TRANSFER FLUIDS

(75) Inventors: Jean-Pierre L. Maes, Merelbeke (BE); Jurgen P. De Kimpe, Ghent (BE); Steven Poppe, Grauuw (NL)

(73) Assignee: Texaco Inc., San Ramon, CA (US)

( * ) Notice: Subject to any disclaimer, the term of this patent is extended or adjusted under 35 U.S.C. 154(b) by 381 days.

This patent is subject to a terminal disclaimer.

(21) Appl. No.: 11/615,399

(22) Filed: Dec. 22, 2006

(65) Prior Publication Data

US 2007/0158612 A1 Jul. 12, 2007

Related U.S. Application Data

(60) Provisional application No. 60/755,471, filed on Dec. 29, 2005.

(51) Int. Cl.
*C09K 5/00* (2006.01)

(52) U.S. Cl. .............................. 252/71; 252/73; 252/75

(58) Field of Classification Search ....................... None
See application file for complete search history.

(56) References Cited

U.S. PATENT DOCUMENTS

| | | | |
|---|---|---|---|
| 3,779,927 | A | 12/1973 | Howell et al. |
| 4,179,522 | A | 12/1979 | Huitson |
| 5,104,562 | A | 4/1992 | Kardos et al. |
| 6,080,331 | A | 6/2000 | Meszaros et al. |
| 6,413,445 | B1 | 7/2002 | Oppenlander et al. |
| 6,508,951 | B1 | 1/2003 | Mori et al. |
| 6,689,289 | B1 | 2/2004 | Maes et al. |
| 2004/0227124 | A1 | 11/2004 | Turcotte et al. |

FOREIGN PATENT DOCUMENTS

| | | | |
|---|---|---|---|
| WO | 9626990 | A1 | 9/1996 |
| WO | 9859013 | A1 | 12/1998 |
| WO | 9937733 | A1 | 7/1999 |

*Primary Examiner*—Necholus Ogden, Jr.
(74) *Attorney, Agent, or Firm*—Penny Prater

(57) ABSTRACT

An aqueous heat transfer fluid comprising a $C_3$ carboxylate freezing point depressant, either solely or in combination with $C_3$-$C_5$ carboxylate freezing point depressants, in combination with $C_6$-$C_{16}$ organic acid salt corrosion inhibitors, provides an antifreeze/coolant composition wherein the corrosion inhibitors exhibit uniquely enhanced solubility, especially at low temperatures, in synergistic combination with the selected carboxylate freezing point depressants.

15 Claims, 2 Drawing Sheets

Figure 1: Substitution of 20 mol % of propionic acid by C1 to C6 acid

POTASSIUM PROPIONATES FOR USE AS FREEZING POINT DEPRESSANTS AND CORROSION PROTECTION IN HEAT TRANSFER FLUIDS

This application claims the benefit under 35 U.S.C. §119 of Provisional Application No. 60/755,471, filed Dec. 29, 2005.

FIELD OF THE INVENTION

The present invention is directed to aqueous heat transfer fluids (also referred to herein as heat exchange, antifreeze or coolant fluids or solutions) that provides protection against freezing at low temperatures and inhibit corrosion of cooling system components.

BACKGROUND OF THE INVENTION

Heat exchange fluids are used in a wide variety of applications to absorb and transport heat away from heat producing surfaces and/or to provide freezing protection depending upon the application. Some examples include: internal combustion engine cooling systems, aircraft deicing, roadway deicing, fuel-cell cooling: systems, heat storage and heat sink systems, solar energy units, refrigeration systems, fire protection systems, hydraulic systems, pharmaceutical reactors, hot water heating systems, air conditioning systems, drilling fluids and power station cooling systems, to name a few. Water is the most commonly used heat exchange fluid because of its universal availability, low cost, excellent heat transfer properties and common use in most contemporary heat exchange applications. However, while water is the preferred heat exchange fluid because it exhibits an optimum combination of high specific heat, high thermal conductivity and low viscosity, it has serious disadvantages, including, metals corrosivity under normal operating conditions, a relatively high freezing point, a nearly 9% expansion upon freezing and a relatively low boiling point. In heat exchange applications these disadvantages mitigated by mixing water with a selection of additives that reduce the freezing point, raise the boiling point and reduce the metal component corrosivity of the water present in heat exchange systems.

Many different additives that function as freezing point depressants in water are known in the prior art. These include, among others: inorganic salts, petroleum products, organic hydroxyl compounds and low molecular weight organic acid salts. For example, early in the development of the internal combustion engine, coolant solutions were formulated with high concentrations of inorganic salts, such as calcium chloride, to depress the freezing point of the solution. One of the major disadvantages of such inorganic salts is the high concentrations necessary to achieve suitable freezing point protection. High concentrations of inorganic salts are extremely corrosive to cooling system components, especially the metal components. Adding to this disadvantage, these corrosive effects cannot be adequately mitigated by the addition of corrosion inhibitors. And, moreover, at very low temperatures the solubility of the inorganic salts is reduced, which further limits the freezing protection level that can be attained in aqueous heat transfer fluids.

Contemporary heat transfer fluid technology includes the use of organic hydroxy compounds, in lieu of inorganic salt compositions, for freezing protection because such compounds are safer, less corrosive and more effective freezing point depressants. In general, water and glycol mixtures are the preferred heat transfer fluid/antifreeze mixtures because such mixtures are chemically stable, compatible with the elastomers and plastics used in modern heat-exchange systems, provide cost efficient freezing and boiling protection and can be formulated with a variety of corrosion inhibitors to provide the specific corrosion protection required for particular heat exchange systems. Compared to water, glycols have a high specific heat, low thermal conductivity and high viscosity. Thus, when glycols are mixed with water the resulting aqueous glycol solutions, as compared to pure water have higher viscosities, higher specific heat, lower thermal conductivity and a lower heat-exchange capacity. However the benefits of freezing point reduction outweigh the loss in heat exchange efficiency.

Among the glycols, ethylene glycol is preferred as a freezing point depressant because of its high boiling and flash points compared to, for example methyl alcohol, its lower viscosity (better fluidity) and relatively lower cost. The primary disadvantage of ethylene glycol is toxicity to animals and other adverse environmental consequences that may result from the improper disposal or other releases into the environment. Other compounds similar to ethylene glycol that are in limited use include glycerol, the lower boiling alcohols, such as methanol and propylene glycol. These compounds are usually selected to mitigate the potential toxicity and possible adverse environmental consequences associated with ethylene glycol.

To address the environmental contamination and toxicity concerns a variety of non-glycol based heat transfer fluid/coolant solutions are being developed. Included among these are the alkali salts of low molecular weight organic acids such, as alkali metal acetate and alkali metal formate, which, like glycol, provide frost protection when dissolved in water. While somewhat similar to aqueous glycol coolant formulations in freezing protection performance, aqueous solutions of low molecular weight organic acids also exhibit improved heat-transfer properties, lower viscosities, low toxicity to humans and animals and low adverse environmental consequences. Certain formate and acetate based fluids have known applications as heat-exchange fluids and airport runway deicing fluids. For example, U.S. Pat. No. 5,104,562 describes a coolant composition containing potassium formate and potassium acetate.

Any aqueous heat transfer fluid/freezing point depressant combination, including non-glycol based formulations, must also include corrosion inhibitors to reduce and control corrosion of the metal surfaces in cooling systems exposed to the fluid. Corrosion control in heat-exchange/cooling systems is highly desirable to mitigate the two principal adverse effects of metal corrosion. (1) deterioration of the metal components either by uniform wastage or localized attack (pitting, crevice corrosion) and, (2) the production of insoluble corrosion products that tend to foul cooling system parts and impede heat transfer by deposition of corrosion byproducts on heat exchange surfaces. These types of problems are addressed, for example in U.S. Pat. No. 6,689,289 which describes corrosion inhibiting, aqueous solutions of organic carboxylates having low eutectic temperatures. In particulars the '289 patent discloses aqueous solutions of low carbon ($C_1$-$C_2$) carboxylic acid salts, in combination with higher carbon ($C_3$-$C_5$) carboxylic acid salts, and $C_1$ to $C_{12}$ carboxylate corrosion inhibitors, which provide synergistically improved freezing and corrosion protection. Such improved freezing point and corrosion protection is demonstrated by adding one or more than one $C_6$-$C_{12}$ carboxylic acid salt corrosion inhibitors to ($C_1$-$C_2$)-($C_3$-$C_5$) carboxylic acid salt freezing point depressants. It is also disclosed in the '289 patent that higher carbon carboxylates ($C_{12}$-$C_{16}$) add to the corrosion protection, but that the solubility thereof in the salt solutions is very limited.

Such limited solubility reduces the degree of additional corrosion protection that could otherwise be obtained with use of the higher carbon carboxylates. It is also known in the art that the solubility of $C_6$ to $C_{16}$ carboxylate corrosion inhibitor combinations in aqueous $C_1$-$C_2$ freezing point depressant solutions is reduced, thereby limiting the corrosion protection afforded in such solutions.

Improved corrosion protection afforded by the higher carbon carboxylate corrosion inhibitors ($C_6$-$C_{16}$) and other inhibitor combinations is very important in heat-exchange/coolant applications where corrosion protection is critical, such as in the thermal management systems of internal combustion engines, industrial heat exchange systems, refrigeration and cooling systems, cooling towers, and any other thermal management system that must operate efficiently in a broad range of ambient temperatures. Additionally, in light of the interest in making non-toxic and environmentally benign heat exchange/coolant compositions available in the marketplace for use in the noted applications, to name a few, there is a need for new, non-glycol based heat exchange fluid compositions that exhibit a high specific heat, high thermal conductivity, low viscosity and that remain liquid over a wide range of temperatures. Heat exchange fluid compositions that meet this need can be provided and made more readily available if the solubility/stability of higher carbon carboxylate corrosion inhibitors can be improved. Accordingly, the object of the present invention is solve the aforementioned a solubility/stability problem and provide a non-glycol coolant/antifreeze composition that meets this need and that provides improved corrosion and freezing point protection over the prior art.

SUMMARY OF THE INVENTION

The present invention is directed to combinations of carboxylate freezing point depressants and carboxylate corrosion inhibitors, wherein the corrosion inhibitors exhibit uniquely enhanced solubility, especially at low temperatures, in synergistic combination with selected carboxylate freezing point depressants. This unique and synergistic combination provides a coolant/heat-transfer fluid composition having heat-transfer and corrosion protection properties with distinct improvements over the prior art in that the invention exhibits surprisingly improved solubility/stability of the corrosion inhibitor, especially at low temperatures, thereby providing improved corrosion protection in thermal management systems over a wider range of ambient temperatures. Specifically we have discovered that an aqueous coolant composition containing a $C_3$ carboxylate freezing point depressant in combination with a $C_6$-$C_{16}$ carboxylate corrosion inhibitor synergistically improves the freezing point protection and corrosion inhibition characteristics of the composition as compared to aqueous coolant compositions containing only $C_1$ or $C_2$ carboxylates or mixtures of the two. Additionally, we have found that more complex mixtures of carboxylate freezing point depressants comprising a $C_3$ carboxylate in combination with ($C_1$-$C_2$)-($C_3$-$C_5$) carboxylic acid salts or in combination with a $C_3$-$C_5$ carboxylate freezing point depressant exhibit similarly improved corrosion inhibition and freezing point protection, due at least in part to the improved solubility of the corrosion inhibitors. Accordingly, one embodiment of the present invention is directed to an aqueous coolant composition comprising a mixture of a $C_3$ carboxylate freezing point depressant and a $C_6$-$C_{16}$ organic acid salt corrosion inhibitor. Optionally, the $C_3$ carboxylate may be combined with ($C_1$-$C_2$)-($C_3$-$C_5$) carboxylic acid salts or $C_3$-$C_5$ carboxylate freezing point depressants. This unique composition provides a heat-transfer/cooling fluid that exhibits low toxicity, is environmentally benign and provides improved heat-transfer properties as compared to traditional glycol based heat-transfer fluids and coolants. Additionally, the composition provides improved corrosion protection compared to formate and acetate based heat-transfer fluids and coolants that contain conventional or carboxylate corrosion inhibitors because the combination of the $C_3$ carboxylate freezing point depressant uniquely and surprisingly improves the solubility of the selected $C_6$-$C_{16}$ corrosion inhibitors. The composition also exhibits enhanced freezing point protection.

DETAILED DESCRIPTION OF THE INVENTION

Figure 1:
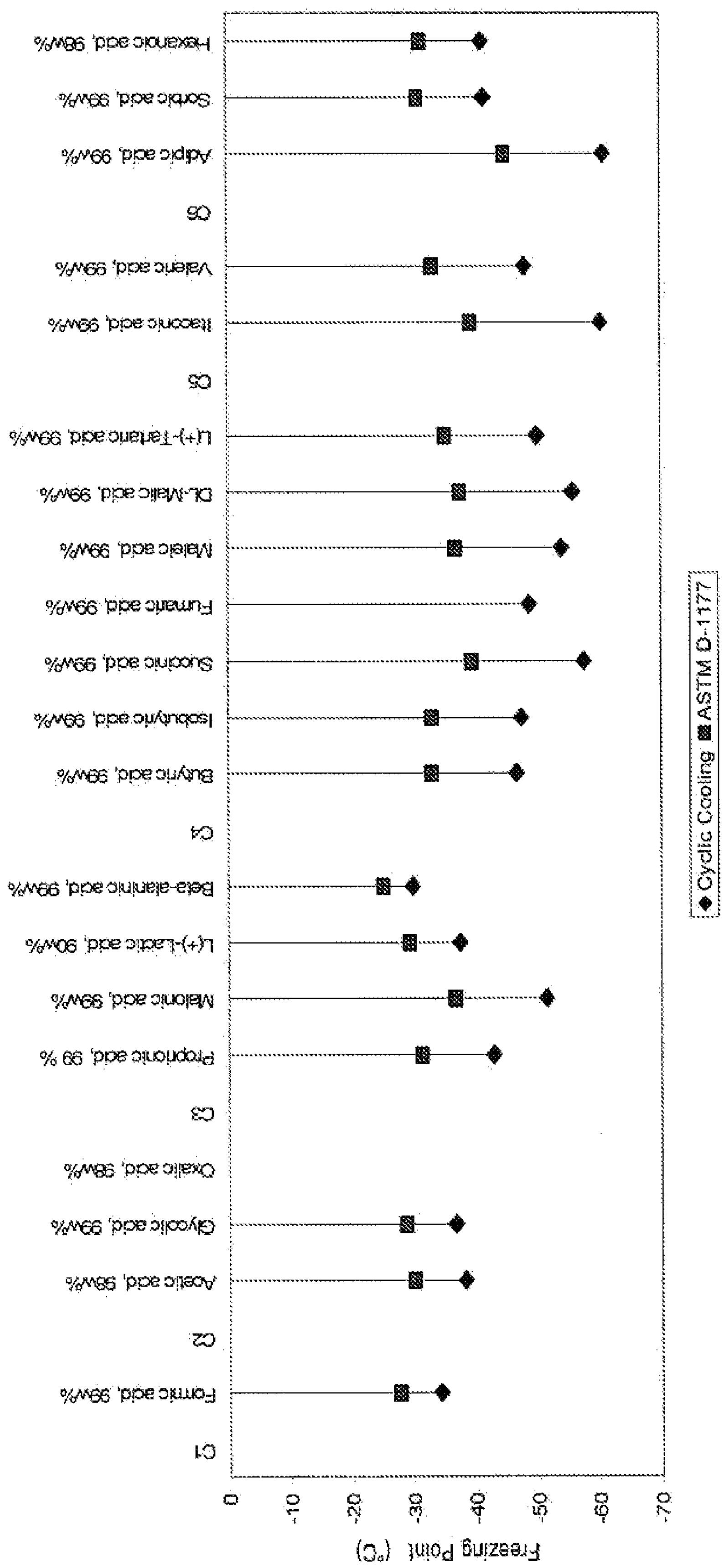
FIG. 1 depicts measured freezing points of the invention according to ASTM standard D-1177 and cyclic freezing point measurements.

The present invention is directed to an antifreeze/coolant/heat transfer fluid composition that exhibits surprisingly improved corrosion protection and freezing point characteristics over the known compositions in the field. The composition comprises a mixture of water, one or more low molecular weight carboxylate freezing point depressants and one or more higher molecular weight carboxylate corrosion inhibitors. We have discovered that combining low molecular weight carboxylate freezing point depressants with higher molecular weight corrosion inhibitors results in synergistic improvement in corrosion protection by improving the solubility of the corrosion inhibitor, especially at low temperatures. Specifically, we have discovered that an aqueous coolant composition containing a $C_3$ carboxylate freezing point depressant in combination with a $C_6$-$C_{16}$ carboxylate corrosion inhibitor synergistically improves the freezing point protection and corrosion inhibition characteristics of the composition as compared to aqueous coolant compositions containing, only $C_1$ or $C_2$ carboxylates or mixtures of the two. Additionally, we have found that more complex mixtures of carboxylate freezing point depressants comprising a $C_3$ carboxylate in combination with ($C_1$-$C_2$)-($C_3$-$C_5$) carboxylic acid salts or in combination with a $C_3$-$C_5$ carboxylate freezing point depressant exhibit similarly improved corrosion inhibition and freezing point protection, due at least in part to the improved solubility of the corrosion inhibitors. The improved solubility provided by the $C_3$ carboxylate is important as it facilitates the selection of efficient inhibitors for applications where corrosion protection is critical. Improved solubility of the corrosion inhibitors also helps to maintain stable solutions, particularly at low temperatures.

Additionally, the combination of carboxylate freezing point depressants can be balanced or tuned to provide optimum heat-transfer properties, viscosities, corrosion protection and freezing protection. Combinations of ($C_1$-$C_2$)-($C_3$-$C_4$) carboxylic acid freezing point depressants appear particularly attractive in combination with $C_6$-$C_{12}$ carboxylate corrosion inhibitors for low temperature heat-transfer applications where heat-transfer, low viscosity and effective corrosion protection are critical. Combinations of $C_3$ carboxylate with $C_4$-$C_{12}$ carboxylates are more attractive for moderate and high temperature applications where the higher viscosity at such temperatures is less important. And carboxylate freezing point depressant combinations including $C_3$ carboxylate provides a significant improvements over $C_1$ and/or $C_2$ combinations, which exhibit low viscosities at low temperatures but limit the carboxylate inhibitor solubility. Such limited inhibitor solubility has negative implications on the ability to dose inhibitors to provide good corrosion protection.

An important factor in managing the solubility of corrosion inhibitors in the heat exchange fluid of the instant invention is the pH of the fluid. In general, high pH is required to solubilize the inhibitors; however, high pH tends to increase the corrosive effects of the solution. High pH can be mitigated to some extent by the addition of imidazole (Table 2). The addition of imidazole or similar compounds that have pKa values between 6 and 10, e.g. molybdate and citric acid, improves the solubility of the inhibitors significantly, although the most stable blends are obtained by combining an elevated pH and imidazole addition. In the various embodiments of the invention pH may range from about 6 to about 10, preferably from about 7.0 to about 9.5, and most preferably from about 8.0 to about 9.5. This is also shown for compositions containing a $C_3$ carboxylate and imidazole (Table 1).

In one embodiment of the present inventions the solubility of a $C_6$-$C_{16}$ carboxylate corrosion inhibitor combination, particularly at low temperature, is significantly improved by the addition of a $C_3$ carboxylate freezing point depressant, either solely or in combination with ($C_1$-$C_2$)-($C_3$-$C_5$) carboxylic acid salts as a freezing point depressant or in combination with $C_3$-$C_5$ carboxylates as freezing point depressant. In another embodiment the addition of imidazole contributes significantly to the solubility of the $C_6$-$C_{16}$ carboxylate corrosion inhibitor and to the solubility of other corrosion inhibitors. In this embodiment a pH between about 8 and about 9.5 is preferred.

Figure 2:
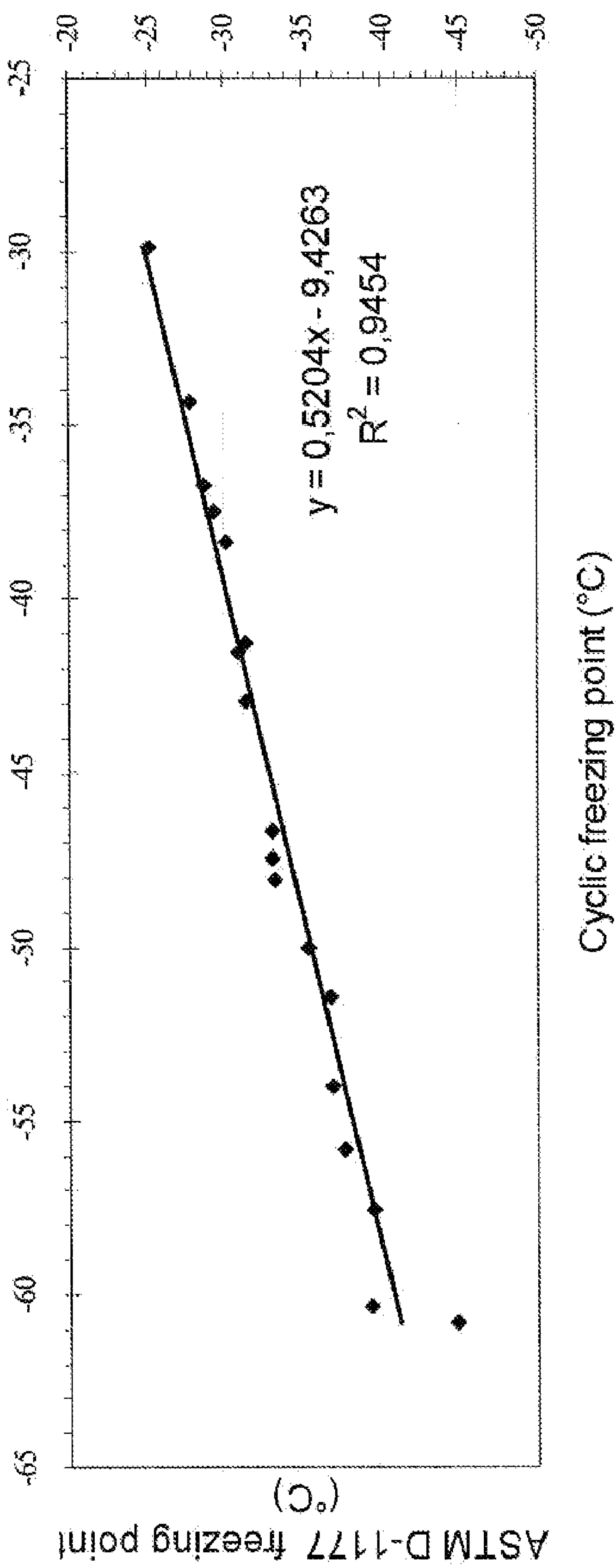
FIG. 2 depicts the correlation between the initial crystallization point of the invention as determined by the ASTM standard test D-1177 and the average under-cooling temperatures of the invention measured in cyclic freezing point determinations.

In addition to enhanced solubility of the corrosion inhibitors, the heat transfer fluid of the present invention exhibits a surprisingly very low freezing point, especially in combinations of $C_3$ carboxylate or combinations of $C_3$-$C_5$ carboxylates as freezing point depressants and $C_6$-$C_{16}$ carboxylate corrosion inhibitors. This is depicted in FIG. 1, which shows the freezing points measured according to ASTM D-1177 and in cyclic freezing point measurements. Freezing point depression and boiling point elevation are colligative properties of a solution; that is, these properties are only dependent on the molarity of the solids and not on their identity. Thus, we observed that the equilibrium freezing point of a heat transfer fluid comprising a $C_3$ carboxylate or combinations of $C_3$-$C_5$ carboxylates, especially in combinations with $C_6$-$C_{12}$ is significantly lower when applied at equimolar dosage. In this regard, we have also observed that the corrosion inhibitor combinations, particularly some combinations of $C_6$-$C_{16}$ carboxylate salts, significantly increase the under-cooling and the equilibrium freezing point depression of the fluids. This is depicted in FIG. 2, which shows the correlation between the initial crystallization point as determined in the ASTM D-1177 test, and the average under-cooling temperatures measured in cyclic freezing point determinations. Under the meta-stable conditions of under-cooling the coolant remains fluid to a large extent until solidification sets in. In the under-cooled state the expansion of the medium is minimal as no phase change occurs. Accordingly, it is another aspect of the invention to provide a heat transfer fluid comprising a combination of carboxylate freezing point depressants and carboxylate corrosion inhibitors which synergistically enhance the range of freezing protection by utilizing the under-cooling effect of the composition. Some of the studied matrices show little or no heat release when solidifying, indicative that glass transition takes place instead of crystallization. Glass transition processes are an important attribute of the carboxylate combinations of the invention as little or no expansion takes place when the glass is formed. This allows for the use of more dilute, less corrosive carboxylate freezing point depressants. These more dilute heat-exchange fluids and coolants also have improved heat-transfer properties, in view of their higher water content. We have also found that the under-cooling properties of the invention can be further improved with the selection of the alkali salts, earth metal salts, ammonia or amine components used to neutralize the carboxylic acids influences the under-cooling properties of the fluids. The effect of the selection of the alkali metals (potassium and sodium) is presented in Table 5.

EXAMPLES

A large number of freezing point depressant and corrosion inhibitor combinations were evaluated for corrosion inhibitor stability and freezing point performance by exposing the solutions to temperatures from room temperature to −35° C. in increments of 5° C. Tables 1 and 2 show the results of the evaluation of stability of different corrosion inhibitor packages in aqueous freezing point depressant solutions. To provide comparable results all the test solutions were blended to a pH 8.6. This pH was selected to give optimal corrosion protection to all metallurgies occurring in internal combustion engines. The concentration of the carboxylate salts used for the freezing point depressant was adjusted to provide freezing protection to −30° C. The added carboxylate corrosion inhibitor combinations provide additional freezing protection Table 1 presents examples of heat transfer fluids containing the sodium or potassium salts of propionic acid ($C_3$ carboxylate) as a freezing point depressant according to this invention. Although the alkali metal salts of propionic acid are the most preferred carboxylates for the composition of this inventions the alkali metal, earth-alkali metal, amine, amide or ammonium salts are also suitable.

Examples 1A to 36A were blended to contain a mixture of freezing point depressants including; 8.99 weight % acetic acid ($C_2$), 9.04 weight % propionic acid ($C_3$) and 4.15 weight % butyric acid ($C_4$). Combinations of carboxylic acid corrosion inhibitors and other corrosion inhibitors were added as shown in the Table. The aqueous solutions were neutralized to about pH 8.6 using a mixture of 1 mass Unit (50 weight %) potassium hydroxide (KOH) and 0.151 mass Units (50 weight %) sodium hydroxide (NaOH). The stability of the carboxylic acid corrosion inhibitors up to the indicated temperature (° C.) is shown, where stability was determined by observation of salt precipitation at the indicated temperature. Observations were made in increments of 5° C. to −35° C.

As expected, the high carbon carboxylates, such as dodecanedioic acid ($C_{12}$) are difficult to stabilize (Examples 15A to 17A). Depending on the concentration of the dodecanedioic acid, salts will start to precipitate at respectively −10° C., 0° C. and 10° C. Most of the other examples show initiation of salt precipitation at temperatures below −15° C. to −20° C. Surprisingly, examples 7A to 10A are stable to −35° C. The freezing point of the various solutions also varies with the composition of the inhibitor package The $C_2$-$C_3$-$C_4$ aqueous freezing point depressant solution has an initial crystallization point according to ASTM Standard method D-1177 of about −30° C. There is a further contribution to a lower freezing point by the addition of the corrosion inhibitor salts. For instance, the ASTM D-1177 initial crystallization point for Example 10A is −35° C.

Examples 1B to 36B were blended to contain a freezing point depressant including 9.15 weight % acetic acid ($C_2$), 9.21 weight % propionic acid ($C_3$) and 4.23 weight % butyric acid ($C_4$) to which combinations of carboxylic acid corrosion inhibitors and other corrosion inhibitors were added. The aqueous solutions were neutralized to about pH 8.6 using a mixture of 1 mass Unit (50 weight %) potassium hydroxide (KOH) and 1.663 mass Units (50 weight %) sodium hydroxide (NaOH), Further improved solubility is found for Examples 1B to 6B, containing heptanoic acid ($C_7$), octanoic acid ($C_8$) and a triazole. Also inhibitor combinations of Examples 7B to 10B, comprising 2-ethylhexanoic acid ($C_8$) and sebacic acid ($C_{10}$) are stable up to −35° C. or beyond. Improved stability is also found for Examples 18B to 21B and Examples 26B to 30B. Other combinations, Examples 22B to 25B, containing an alkylbenzoic acid (p-tertbutylbenzoic acid) are less stable. This is also the case for the combinations containing a $C_9$ acid (cekanoic acid). The compositions comprising the $C_{12}$ acid (Examples 15B to 17B) are not stable at room temperature (about 23° C.). Examples 1C to 36C are blended with propionate ($C_3$) (18.75 weight % as propionic acid) alone as freezing point depressant. Further improved solubility is observed for Examples 7C to 10C, showing clear solutions up to −35° C. Improved solubility is also found for inhibitor combinations containing high amounts of sebacic acid ($C_{10}$), Examples 26C to 30C.

TABLE 1

Evaluation of stability of corrosion inhibitor packages in freezing point depressants containing C3 carboxylate.

Nominal Composition of Freezing Point Depressants

| | |
|---|---|
| Examples 1A-35A: | 8.99 w % acetic acid + 9.04 w % propionic acid + 4.15 w % butyric acid, neutralized with a mixture of 1 mass Unit 50 w % KOH + 0.151 mass Units 50 w % NaOH |
| Examples 1B-36B: | 9.15 w % acetic acid + 9.21 w % propionic acid + 4.23 w % butyric acid, neutralized with a mixture of 1 mass Unit 50 w % KOH + 1.663 mass Units 50 w % NaOH |
| Examples 1C-36C: | 18.75 w % propionic acid neutralized with 50 w % NaOH |

| Corrosion Inhibitor Combinations | | | | | | | | | Results of inhibitor Stability Tests in Different Freezing Point Depressants | | | | | |
|---|---|---|---|---|---|---|---|---|---|---|---|---|---|---|
| Heptanoic acid | Octanoic acid | Cekanoic acid | Dodecanedioic acid | 2-ethylhexanoic acid | p-tertbutylbenzoic acid | Sebacic acid | Tolyltriazole | Imidazole | C2-C3-C4 Example No | Stable up to (° C.) | C2-C3-C4 Example No | Stable up to (° C.) | C3 Example No | Stable up to (° C.) |
| 1.50 | 0.50 | | | | | | 0.10 | | 1 A | −15 | 1 B | −25 | 1 C | −20 |
| 1.875 | 0.625 | | | | | | 0.10 | | 2 A | −15 | 2 B | −25 | 2 C | −20 |
| 2.25 | 0.75 | | | | | | 0.10 | | 3 A | −20 | 3 B | −25 | 3 C | −15 |
| 2.00 | 1.00 | | | | | | 0.10 | | 4 A | −20 | 4 B | −25 | 4 C | −15 |
| 1.75 | 1.25 | | | | | | 0.10 | | 5 A | −15 | 5 B | −20 | 5 C | −15 |
| 1.50 | 1.50 | | | | | | 0.10 | | 6 A | −10 | 6 B | −15 | 6 C | −5 |
| | | | | 1.26 | | 0.10 | 0.08 | 0.016 | 7 A | −35 | 7 B | −35 | 7 C | Clear |
| | | | | 1.74 | | 0.14 | 0.11 | 0.021 | 8 A | −35 | 8 B | −35 | 8 C | Clear |
| | | | | 2.17 | | 0.17 | 0.13 | 0.027 | 9 A | −35 | 9 B | −35 | 9 C | Clear |
| | | | | 2.58 | | 0.20 | 0.16 | 0.032 | 10 A | −35 | 10 B | Clear | 10 C | Clear |
| 1.50 | 0.50 | 0.50 | | | | | 0.10 | | 11 A | −25 | 11 B | −20 | 11 C | −25 |
| 1.50 | 0.50 | 0.90 | | | | | 0.10 | | 12 A | −25 | 12 B | −20 | 12 C | −25 |
| 1.50 | 0.75 | 0.90 | | | | | 0.10 | | 13 A | −25 | 13 B | −20 | 13 C | −25 |
| 1.50 | 1.00 | 0.50 | | | | | 0.10 | | 14 A | −25 | 14 B | −20 | 14 C | −15 |
| 1.50 | 0.50 | | 0.20 | | | | 0.10 | | 15 A | −10 | 15 B | NT | 15 C | NT |
| 1.50 | 0.50 | | 0.40 | | | | 0.10 | | 16 A | 0 | 16 B | NT | 16 C | NT |
| 1.50 | 0.50 | | 0.60 | | | | 0.10 | | 17 A | 10 | 17 B | NT | 17 C | NT |
| 1.50 | 0.50 | | | 0.50 | | | 0.10 | | 18 A | −25 | 18 B | −35 | 18 C | −30 |
| 1.50 | 0.50 | | | 0.90 | | | 0.10 | | 19 A | −25 | 19 B | Clear | 19 C | Clear |
| 1.50 | 0.75 | | | 0.90 | | | 0.10 | | 20 A | −15 | 20 B | −35 | 20 C | −35 |
| 1.50 | 1.00 | | | 0.50 | | | 0.10 | | 21 A | −15 | 21 B | −35 | 21 C | −20 |
| 1.50 | 0.50 | | | | 0.50 | | 0.10 | | 22 A | −25 | 22 B | −20 | 22 C | −15 |
| 1.50 | 0.50 | | | | 0.90 | | 0.10 | | 23 A | −20 | 23 B | NT | 23 C | −5 |
| 1.50 | 0.75 | | | | 0.90 | | 0.10 | | 24 A | −15 | 24 B | NT | 24 C | −10 |
| 1.50 | 1.00 | | | | 0.50 | | 0.10 | | 25 A | −25 | 25 B | −10 | 25 C | −10 |
| 1.50 | 0.50 | | | | | 0.20 | 0.10 | | 26 A | −20 | 26 B | −25 | 26 C | −30 |
| 1.50 | 0.50 | | | | | 0.40 | 0.10 | | 27 A | −25 | 27 B | −25 | 27 C | −30 |
| 1.50 | 0.50 | | | | | 0.60 | 0.10 | | 28 A | −15 | 28 B | −25 | 28 C | −30 |
| 1.50 | 0.50 | | | | | 0.80 | 0.10 | | 29 A | −15 | 29 B | −25 | 29 C | −30 |
| 1.50 | 0.50 | | | | | 1.00 | 0.10 | | 30 A | −15 | 30 B | −25 | 30 C | −35 |
| | 0.90 | | | 0.90 | 0.90 | | 0.10 | | 31 A | −15 | 31 B | NT | 31 C | −10 |
| | | | | 0.90 | 0.90 | | 0.10 | | 32 A | −25 | 32 B | NT | 32 C | −25 |
| | 0.80 | | | 0.80 | 0.80 | 0.20 | 0.10 | | 33 A | −20 | 33 B | NT | 33 C | −15 |
| | 0.80 | | | 0.80 | 0.80 | 0.40 | 0.10 | | 34 A | −20 | 34 B | NT | 34 C | −15 |
| | 0.80 | | 0.20 | 0.80 | 0.80 | | 0.10 | | 35 A | −10 | 35 B | NT | 35 C | −15 |
| | 0.80 | | 0.40 | 0.80 | 0.80 | | 0.10 | | 36 A | 0 | 36 B | NT | 36 C | NT |

NT: not further tested; composition is not stable at room temperature.

Comparative Examples are shown in Table 2. Some of the same corrosion inhibitor packages were blended in aqueous carboxylate freezing point depressants; in some examples, excluding a $C_3$ carboxylate and in other examples including a $C_3$ carboxylate. As with the examples presented in Table 1, the pH of the aqueous solutions was adjusted to pH 8.6. Comparing the test results presented in Table 2 with the test results presented in Table 1, it is clear that the presence of a $C_3$ carboxylate freezing point depressant plays an important role in enhancing the solubility of the different combinations of $C_6$-$C_{16}$ carboxylate and other corrosion inhibitors.

TABLE 2

Evaluation of stability of corrosion inhibitor packages in C1 or/and C2, C1 and C3 and C3 freezing point depressants.

Nominal Composition of Freezing Point Depressants

Examples 1A-6A: 20.40 w % formic acid (C1) neutralized to pH 8.6 with 50 w % KOH
Examples 1B-6B: 20.80 w % acetic acid (C2) neutralized to pH 8.6 with 50 w % KOH
Examples 1C-6C: 10.20 w % formic acid (C1) and 10.60 w % acetic acid (C2) neutralized to pH 8.6 with 50 w % KOH
Examples 1D-6D: 11.7 w % formic acid (C1) and 11.7 w % propionic acid (C3) neutralized to pH 8.6 with 50 w % KOH
Examples 1E-6E: 23.9 w % propionic acid (C3) neutralized to pH 8.6 with 50 w % KOH
For tests at pH = 9.4 the alkalinity was increased by adding 50 w % KOH

| Corrosion Inhibitor Combinations | | | | | | | Results of inhibitor Stability Tests in Different Freezing Point Depressants | | | | | | | | | |
|---|---|---|---|---|---|---|---|---|---|---|---|---|---|---|---|---|
| Heptanoic acid | Octanoic acid | 2-ethylhexanoic acid | Sebacic acid | Tolyltriazole | Imidazole | pH | C1 Example No | Stable up to (° C.) | C2 Example No | Stable up to (° C.) | C1-C2 Example No | Stable up to (° C.) | C1-C3 Example No | Stable up to (° C.) | C3 Example No | Stable up to (° C.) |
| 1.50 | 0.50 | | | 0.10 | | 8.6 | 1 A | NT | 1 B | −10 | 1 C | −10 | 1 D | −5 | 1 E | −20 |
| 1.50 | 0.50 | | | 0.10 | | 9.4 | 2 A | NT | 2 B | | 2 C | | 2 D | −25 | 2 E | −40 |
| 1.50 | 0.50 | | | 0.10 | 0.05 | 8.5 | 3 A | | 3 B | | 3 C | | 3 D | −15 | 3 E | −20 |
| 1.50 | 0.50 | | | 0.10 | 0.05 | 9.4 | 4 A | −40 | 4 B | −25 | 4 C | | 4 D | −45 | 4 E | −45 |
| | | 2.58 | 0.20 | 0.16 | 0.032 | 8.6 | 5 A | −40 | 5 B | −35 | 5 C | −40 | 5 D | −45 | 5 E | −45 |
| 1.50 | 0.50 | | 1.00 | 1.00 | | 9.4 | 6 A | NT | 6 B | NT | 6 C | NT | 6 D | NT | 6 E | −10 |

NT: not further tested; composition is not stable at room temperature.

Improved stability or solubility of the corrosion inhibitors contained in heat transfer fluids also results in improved corrosion protection. The corrosion protection properties for a number of carboxylate heat-exchange fluid formulations were verified by electrochemical corrosion measurement technique, known as potentiostatic cyclic polarization. The results are presented in Table 3.

TABLE 3

Electrochemical Evaluation of Corrosion Protection Properties

Nominal Composition of Freezing Point Depressants

Examples 1A-36A: 8.99 w % acetic acid + 9.04 w % propionic acid + 4.15 w % butyric acid, neutralized with a mixture of 1 mass Unit 50 w % KOH + 0.151 mass Units 50 w % NaOH
Examples 1B-36B: 9.15 w % acetic acid + 9.21 w % propionic acid + 4.23 w % butyric acid, neutralized with a mixture of 1 mass Unit 50 w % KOH + 1.663 mass Units 50 w % NaOH

| Corrosion Inhibitor Combinations | | | | | | | | | Result for the corrosion protection of cast iron and solder | | | | | |
|---|---|---|---|---|---|---|---|---|---|---|---|---|---|---|
| Heptanoic acid | Octanoic acid | Cekanoic acid | Dodecanedioic acid | 2-ethyl hexanoic acid | p-tert-butylbenzoic acid | Sebacic acid | Tolyltriazole | Imidazole | C2-C3-C4 Example No | Cast Iron | Solder | C2-C3-C4 Example No | Cast Iron | Solder |
| 1.50 | 0.50 | | | | | | 0.10 | | 1 A | + | ++ | 1 B | + | ++ |
| 1.875 | 0.625 | | | | | | 0.10 | | 2 A | ++ | +++ | 2 B | ++ | +++ |
| 2.25 | 0.75 | | | | | | 0.10 | | 3 A | NT | NT | 3 B | ++ | +++ |
| 2.00 | 1.00 | | | | | | 0.10 | | 4 A | NT | NT | 4 B | ++ | +++ |
| 1.75 | 1.25 | | | | | | 0.10 | | 5 A | + | + | 5 B | ++ | +++ |
| 1.50 | 1.50 | | | | | | 0.10 | | 6 A | + | + | 6 B | + | ++ |
| | | | | 1.26 | | 0.10 | 0.08 | 0.016 | 7 A | NT | NT | 7 B | + | ++ |
| | | | | 1.74 | | 0.14 | 0.11 | 0.021 | 8 A | NT | NT | 8 B | + | ++ |
| | | | | 2.17 | | 0.17 | 0.13 | 0.027 | 9 A | + | ++ | 9 B | + | ++ |

TABLE 3-continued

| Electrochemical Evaluation of Corrosion Protection Properties | | | | | | | | | | | | | | |
|---|---|---|---|---|---|---|---|---|---|---|---|---|---|---|
| | | | | 2.58 | | 0.20 | 0.16 | 0.032 | 10 A | + | ++ | 10 B | + | ++ |
| 1.50 | 0.50 | 0.50 | | | | | 0.10 | | 11 A | + | ++ | 11 B | + | ++ |
| 1.50 | 0.50 | 0.90 | | | | | 0.10 | | 12 A | + | ++ | 12 B | + | ++ |
| 1.50 | 0.75 | 0.90 | | | | | 0.10 | | 13 A | ++ | +++ | 13 B | ++ | +++ |
| 1.50 | 1.00 | 0.50 | | | | | 0.10 | | 14 A | ++ | +++ | 14 B | + | ++ |
| 1.50 | 0.50 | | 0.20 | | | | 0.10 | | 15 A | + | ++ | 15 B | + | ++ |
| 1.50 | 0.50 | | | 0.50 | | | 0.10 | | 18 A | + | ++ | 18 B | + | ++ |
| 1.50 | 0.50 | | | 0.90 | | | 0.10 | | 19 A | + | ++ | 19 B | + | ++ |
| 1.50 | 0.75 | | | 0.90 | | | 0.10 | | 20 A | + | ++ | 20 B | + | ++ |
| 1.50 | 1.00 | | | 0.50 | | | 0.10 | | 21 A | + | ++ | 21 B | + | ++ |
| 1.50 | 0.50 | | | | 0.50 | | 0.10 | | 22 A | + | ++ | 22 B | NT | NT |
| 1.50 | 0.50 | | | | 0.90 | | 0.10 | | 23 A | + | ++ | 23 B | NT | NT |
| 1.50 | 0.75 | | | | 0.90 | | 0.10 | | 24 A | ++ | ++ | 24 B | NT | NT |
| 1.50 | 1.00 | | | | 0.50 | | 0.10 | | 25 A | ++ | ++ | 25 B | NT | NT |
| | 0.90 | | | 0.90 | 0.90 | | 0.10 | | 31 A | + | ++ | 31 B | NT | NT |
| | | | | 0.90 | 0.90 | | 0.10 | | 32 A | + | ++ | 32 B | NT | NT |
| | 0.80 | | | 0.80 | 0.80 | 0.20 | 0.10 | | 33 A | + | ++ | 33 B | NT | NT |
| | 0.80 | | | 0.80 | 0.80 | 0.40 | 0.10 | | 34 A | + | ++ | 34 B | NT | NT |
| | 0.80 | | 0.20 | 0.80 | 0.80 | | 0.10 | | 35 A | + | ++ | 35 B | NT | NT |
| | 0.80 | | 0.40 | 0.80 | 0.80 | | 0.10 | | 36 A | + | ++ | 36 B | NT | NT |

NT: not tested

The corrosion protection properties of the pure carboxylate beat transfer fluid and engine coolants can be further modified and improved by the addition of traditional and mineral inhibitors, such as; molybdates, nitrates, nitrites, borates, phosphates, benzoates and silicates preferentially in combination with stabilizing agents, such as; chromates, thiazoles, hydrazines, amines and imines. Preferably non-toxic compounds such as alkaline metal molybdates, benzoates, nitrates and borates are used.

Foaming and air content of the carboxylate heat transfer fluid, with or without traditional or mineral inhibitors can be reduced by the use of antifoams, defoamers and air release agents.

Combinations that exhibit improved stability can further be improved by increasing the dosage of corrosion inhibitors or by adding specific conventional inhibitors such as molybdate or benzoate. This is, for instance, the case for examples 10A, 10B, 19A and 19B Good solubility and good corrosion protection is also observed for Examples 2B, 13A and 14A. These observed corrosion inhibition and freeing protection effects of this invention are also confirmed in the ASTM D-1384 glassware test. Table 4 illustrates the combined effect of using potassium propionate as a matrix, having an elevated pH and imidazole/molybdate addition for inhibitor stabilization and corrosion prevention. It is apparent that the addition of a molybdate corrosion inhibitor is useful to control the corrosion protection of solder. Molybdate is also found useful to reduce corrosion of ferrous metals in some formate containing formulations.

TABLE 4

ASTM D-1384 glassware corrosion test, comparing blends with ASTM D-1177 freezing point of −37° C.

Example A: 9.945 w % formic acid + 9.945 x % propionic acid + 1.275 w % heptanoic acid + 0.425 w % octanoic acid + 0.1 w % TTZ neutralized with 50 w % KOH, pH = 8.6
Example B: 23.4% propionic acid + 1.5 w % heptanoic acid + 0.5 w % octanoic acid + 0.5 w % p-tertbutylbenzoic acid + 0.1 w % TTZ neutralized with 50 w % KOH, pH = 9.4
Example C: 23.4% propionic acid + 1.5 w % heptanoic acid + 0.5 w % octanoic acid + 0.5 w % p-tertbutylbenzoic acid + 0.1 w % TTZ + 0.3 w % Sodiummolybdate•2H2O + 0.04 w % Imidazole, neutralized with 50 w % KOH, pH = 9.4

TABLE 4-continued

ASTM D-1384 glassware corrosion test, comparing blends with ASTM D-1177 freezing point of −37° C.

Example D: 23.15% propionic acid + 1.5 w % heptanoic acid + 0.5 w % octanoic acid + 0.6 w % Sebacic acid + 0.1 w % TTZ neutralized with 50 w % KOH, pH = 9.4
Example E: 23.15% propionic acid + 1.5 w % heptanoic acid + 0.5 w % octanoic acid + 0.6 w % Sebacic acid + 0.1 w % TTZ + 0.3 w % Sodiummolybdate•2H2O + 0.04 w % Imidazole, neutralized with 50 w % KOH, pH = 9.4
Example F: 23.4% propionic acid + 1.5 w % heptanoic acid + 0.5 w % octanoic acid + 0.5 w % cekanoic acid + 0.1 w % TTZ neutralized with 50 w % KOH, pH = 9.1
Example G: 23.4% propionic acid + 1.5 w % heptanoic acid + 0.5 w % octanoic acid + 0.5 w % cekanoic acid + 0.1 w % TTZ + 0.3 w % Sodiummolybdate•2H2O + 0.04 w % Imidazole neutralized with 50 w % KOH, pH = 9.1
Example H: 23.6% propionic acid + 1.5 w % heptanoic acid + 1.5 w % octanoic acid + 0.1 w % TTZ neutralized with 50 w % KOH, pH = 9.4
Example I: 23.6% propionic acid + 1.5 w % heptanoic acid + 1.5 w % octanoic acid + 0.1 w % TTZ + 0.3 w % Sodiummolybdate•2H2O + 0.04 w % Imidazole neutralized with 50 w % KOH, pH = 9.4

| | Weight loss per coupon, mg. | | | | | |
|---|---|---|---|---|---|---|
| Example | Aluminum | Cast iron | Carbon steel | Copper | Solder | Brass |
| ASTM limit | 30 | 10 | 10 | 10 | 30 | 10 |
| A | 4 | 42 | 183 | 3 | 115 | 3 |
| B | 14 | 0.3 | 1.4 | 3.5 | 81.2 | 2.8 |
| C | 7.7 | 1 | 0.1 | 2.8 | 14.3 | 6.1 |
| D | 5.3 | 1.5 | 1 | 3.9 | 118.4 | 5.9 |
| E | 2.8 | 0.2 | 0.4 | 2.7 | 10 | 3.3 |
| F | 11.8 | 2.2 | 1 | 2.9 | 111 | 3.7 |
| G | 0.6 | 0.5 | 0.6 | 2.3 | 7.5 | 2.9 |
| H | 16.9 | 1.9 | 0.6 | 3.6 | 94 | 3.5 |
| I | 9.4 | −1.1 | 0.5 | 3.1 | 15.4 | 3.7 |

In addition to improved solubility of corrosion inhibitors and the related enhancement in corrosion protective characteristics the compositions of this invention exhibited reduced freezing points and therefore provide improved freezing point protection. Very low freezing points have been found for $C_3$ carboxylates or combinations of $C_3$-$C_5$ or even $C_6$ carboxylates as freezing point depressant, particularly when combined with $C_6$-$C_{16}$ carboxylate corrosion inhibitors. In combination with $C_3$, the higher carboxylates contribute both to a lower initial crystallization point according to ASTM D-1177 and to strong meta-stable under-cooling. As shown in Table 1, Example 10A has an ASTM D-1177 initial crystallization point of −35° C. In cyclic cooling at a rate of 40° C. per hour, under-cooling up to −53° C. was observed.

To study which carboxylate salts are effective in combination with $C_3$ freezing point depressant 20 mol % of propionic acid was substituted with 20 mol % of a $C_1$ to $C_6$ carboxylic acid in aqueous solutions containing 22 to 33 weight % propionic acid ($C_3$). The solutions were neutralized to pH 8.6 with 50 w % KOH. FIG. 1 shows the measured freezing points according to ASTM D-1177 and in cyclic freezing point measurements. The top of the under-cooling curve was used to measure temperatures of meta-stable under-cooling at a cooling rate of 40° C. per hour. FIG. 2 shows the correlation between the initial crystallization point as determined in the ASTM D-1177 test, and the average under-cooling temperatures measured in cyclic freezing point determinations. Excellent correlation is found. From FIG. 1 it is found that the longer chain acids have a significant impact on the freezing point. Combinations of propionic acid and $C_4$-$C_6$ acids show low freezing points. In particular, combinations of propionic acid with succinic and/or adipic acid are interesting as both succinic and adipic acids are well-known corrosion inhibitors. Table 5 shows the effect of the selection of the alkali metal, potassium or sodium, used to neutralize equimolar amounts of carboxylic acids on the ASTM D-1177 freezing points as well as the under-cooling properties.

TABLE 5

Effect of selection of alkalimetal on ASTM D-1177 and cyclic freezing points

| | All blends contain equimolar amounts of salt | | | |
|---|---|---|---|---|
| | Neutralization with Potassium hydroxide | | Neutralization with Sodium hydroxide | |
| 20 mol % substitution Propionic acid | ASTM D-1177 freezing point (° C.) | Cyclic freezing point (° C.) | ASTM D-1177 freezing point (° C.) | Cyclic freezing point (° C.) |
| Propionic acid (Control) | −31 | −43 | −27 | −35 |
| Formic acid | −28 | −34 | −24 | −29 |
| Acetic acid | −30 | −38 | −26 | −32 |
| Glycolic acid | −29 | −37 | −24 | −31 |
| Malonic acid | −37 | −51 | −30 | −48 |
| Lactic acid | −29 | −37 | −25 | −31 |
| Alanine | −25 | −30 | −22 | −25 |
| Butyric acid | −33 | −47 | −27 | −36 |
| Isobutyric acid | −33 | −47 | −28 | −38 |
| Succinic acid | −39 | −58 | −25 | −42 |
| Fumaric acid | −30 | −49 | insoluble | insoluble |
| Maleic acid | −37 | −54 | −31 | −49 |
| Malic acid | −38 | −56 | −30 | −50 |
| Tartaric acid | −35 | −50 | insoluble | insoluble |
| Itaconic acid | −39 | −60 | −33 | −59 |
| Valeric acid | −33 | −48 | −28 | −67 |
| Adipic acid | −45 | −65 | −36 | −53 |
| Sorbic acid | −31 | −42 | insoluble | insoluble |
| Hexanoic acid | −31 | −41 | insoluble | insoluble |

The fluids of this invention can be used in any heat-exchange or cooling application including, for example, industrial heat-exchangers, refrigeration~and cooling systems, cooling towers, open- and closed heat exchangers, ice-rinks, artificial ski slopes, and deicing systems such as for aircraft and roadways, antifreeze for aggregate slurries, corrosion inhibitor for fire protection sprinkler systems and many other like uses. Due to the improved corrosion protection the heat-transfer fluids of the present invention are particularly suitable for temperature control and cooling of internal combustion engines. The fluids protect the equipment from freezing and corrosion damage while providing efficient heat transfer characteristics.

The above description of preferred embodiments of the invention is intended to be descriptive and not limiting as to the scope of the invention, which is defined by the following claims.

What is claimed is:

1. An aqueous coolant composition comprising a mixture of a potassium salt of propionic acid freezing point depressant and a C6-C16 organic acid salt corrosion inhibitor further comprising a buffering agent and an inorganic corrosion inhibitor.

2. The coolant composition of claim 1 further comprising a mixture of a C3-C5 carboxylate freezing point depressant.

3. The composition of claim 1 wherein the C6-C16 organic acid salt corrosion inhibitor is an aliphatic organic acid salt.

4. The composition of claim 1 wherein the C6-C16 organic acid salt corrosion inhibitor is an aromatic organic acid salt.

5. The composition of claim 1 wherein the C6-C16 organic acid salt is selected from the group consisting of the alkali metal, alkaline-earth metals ammonium and amine carboxylic acid salts of heptanoic acid, octanoic acid, cekanoic acid, dodecanedioic acid, 2-ethylhexanoic acid, p-tertbutylbenzoic acid and sebacic acid.

6. The composition of claim 1 further comprising one or more corrosion inhibitors selected from the group consisting of triazoles and thiazoles.

7. The composition of claim 1 wherein the buffering agent has a pKa ranging from 6 to 10 and the inorganic corrosion inhibitor is a molybdate salt.

8. The composition of claim 7 wherein the pH ranges from 6.5 to 10.0.

9. The composition of claim 7 wherein the pH ranges from 8.0 to 9.5.

10. The composition of claim 1 further comprising a (C1-C2)-(C3-C5) carboxylate freezing point depressant.

11. The composition of claim 10 wherein the (C1-C2)-(C3-C5) carboxylate freezing point depressant is selected from the group consisting of alkali metal, alkaline-earth metal, ammonium and amine carboxylic acid salts of said freezing point depressant.

12. The composition of claim 5 wherein the C6-C16 carboxylic acid salts are soluble at temperatures between about 0[deg] C. and −35[deg] C.

13. The composition of claim 12 wherein the C6-C16 carboxylic acid salts are soluble at temperatures between about −10[deg] C. and −35[deg] C.

14. The composition of claim 12 wherein the C6-C16 carboxylic acid salts are soluble at temperatures between about −20[deg] C. and −35[deg] C.

15. The composition of claim 6 wherein the selected triazole is a tolytriazole.

* * * * *